United States Patent [19]
Heikes

[11] Patent Number: 5,304,994
[45] Date of Patent: Apr. 19, 1994

[54] MINIMAL DELAY LEADING ONE DETECTOR WITH RESULT BIAS CONTROL

[75] Inventor: Craig Heikes, Fort Collins, Colo.

[73] Assignee: Hewlett Packard Company, Palo Alto, Calif.

[21] Appl. No.: 896,529

[22] Filed: Jun. 9, 1992

[51] Int. Cl.[5] .............................. H03M 7/00
[52] U.S. Cl. ........................ 341/50; 341/79
[58] Field of Search ................. 341/50, 79, 51

[56] References Cited

U.S. PATENT DOCUMENTS

| | | | |
|---|---|---|---|
| 4,677,625 | 6/1987 | Betts et al. | 341/81 X |
| 5,097,261 | 3/1992 | Langdon, Jr. et al. | 341/51 |
| 5,115,240 | 5/1992 | Fujiwara et al. | 341/51 |
| 5,144,304 | 9/1992 | McMahon et al. | 341/58 |

OTHER PUBLICATIONS

"Introduction to Arithmetic For Digital Systems Designers", Shlomo, Waser, pp. 119–123, ISBN 0-0-3-060571-7.

"Digital Computer Arithmetic-Design and Implementation" Cavanagh, Joseph, J. F., pp. 388, 391, ISBN 0-07-010282-1.

Primary Examiner—Sharon D. Logan

[57] ABSTRACT

A circuit and a method for providing an indication of the position of a bit having a selected characteristic in an n-bit binary word are disclosed. The n bits of the binary word are arranged into groups of W bits so that each group is input to a fundamental encoder. The position of the bit having the selected characteristic, among each group of W bits is provided as an encoded output. A multiplexer tree provides a single output indicative of the position of the bit having the selected characteristic in the binary word based on the encoded outputs from the encoders.

20 Claims, 7 Drawing Sheets

MINIMAL DELAY LEADING ONE DETECTOR WITH RESULT BIAS CONTROL

FIELD OF THE INVENTION

The present invention relates generally to a circuit and a method for locating a particular logic value in a binary word. In particular, the present invention provides a circuit and a method to locate such a value with minimal circuit delay and with bias control.

BACKGROUND

Computer data is typically stored as a series of binary '1's and '0's defining a word, where each binary word is stored in a memory such as a shift register. Detecting the position of the first (or leading) binary '1' in a binary sequence is often desirable for computer related operations. For instance, it is necessary to detect the position of the leading '1' to perform floating point addition and subtraction, to convert integers to floating point representations, and to normalize a floating point representation to maximize precision.

FIG. 1 shows the IEEE (Institute of Electrical and Electronics Engineers) double precision floating point data format (ANSI/IEEE Std. 754-1985). This format is employed in nearly all floating point microprocessors, including the Intel 8087/287/387 series and the Motorola 68881, and is therefore virtually universal in microcomputers that use these microprocessors including IBM Personal Computers.

The data format shown in FIG. 1 comprises 64 bits, $B_0$ to $B_{63}$. The mantissa or fractional part 10 comprises 52 bits, $B_0$ to $B_{51}$, representing the significant digits of the number to be represented. The exponential part 12 comprises 11 bits, $B_{52}$ to $B_{62}$, and is a power of 2 multiplier applied to the mantissa 10. The exponent is "biased" by adding 1024, so that the exponent field "01111111111" corresponding to bits $B_{62}$ to $B_{52}$ respectively, represents a numerical exponent of zero. Thus the decimal equivalent of the binary exponential part 12 may range from $-1023$ to $+1024$ indicating that the mantissa 10 may be multiplied by powers of 2 between $-1023$ and $1024$. Additionally a sign bit 14 is included as the most significant bit (MSB) $B_{63}$ of the entire 64-bit word and identifies the sign of the mantissa 10.

If M is the value of the mantissa 10 and E is the value of the exponential part 12, then the value of the number represented by the 64-bit word of FIG. 1 is:

$$\pm M(B^{E-1024})$$

where B is the standard base value. For instance, where each bit is a binary digit, i.e. '1' or '0', the base B is 2.

To achieve even greater precision, the mantissa 10 is normalized by shifting it left and decrementing the exponent 12 until the MSB of the mantissa 10, $B_{51}$, is a '1'. The resulting value gains the precision in bits equivalent to the number of positions shifted. Since the resulting mantissa will always have a MSB $B_{51}$ of '1', it would be redundant to retain it. The mantissa 10 is, therefore, typically shifted one more position to the left to discard the leading '1' and the exponential part 12 is decremented one more time. The resulting number gains one more bit of precision. The range of numbers which can be represented is $\pm(2^1)(2^{-1023})$ to $\pm(2^{1024})$ or $\pm 2.2 \times 10^{-308}$ to $\pm 1.8 \times 10^{308}$.

Thus, to maximize the precision of a floating point number, a leading one detector (LOD) may be used to locate the position of the leading '1' in the mantissa 10 and encode its position in a binary word. A resulting encoded word specifies the number of times the mantissa 10 is to be shifted to position the leading '1', one position beyond the MSB of the mantissa 10 or one position left of bit $B_{51}$ so that it can be discarded. Shifters may be used to carry out this operation. The bits which store the mantissa are then shifted according to the value of the encoded word and the bits of the exponential part 12 are correspondingly decremented with the aid of other circuitry.

Another example of the use of a leading one detector is for integer-to-floating point conversions. Consider the example of a double precision integer which contains 64 bits, $B_{63}$-$B_0$, one of which is a sign bit $B_{63}$ and the other 63 bits represent the value of an integer. In order to execute the integer-to-floating point conversion, the 63 bits of the integer are mapped into the 52 bit mantissa 10 of the floating point data format shown in FIG. 1. When the leading '1' is positioned in the most significant 10 bits, $B_{62}$-$B_{53}$, of the integer format, then the integer bits must be shifted right until the leading '1' is shifted to bit $B_{52}$. The number of shifts required for the integer-to-floating point conversion is provided in Table 1, below.

TABLE 1

| Integer Leading One Bit Position | Right Shift Amount (Encoded LOD Value) |
|---|---|
| $B_{62}$ | 10 |
| $B_{61}$ | 9 |
| $B_{60}$ | 8 |
| $B_{59}$ | 7 |
| $B_{58}$ | 6 |
| $B_{57}$ | 5 |
| $B_{56}$ | 4 |
| $B_{55}$ | 3 |
| $B_{54}$ | 2 |
| $B_{53}$ | 1 |
| $B_{52}$ | 0 |

In this example to determine how many shifts must be made, a bias value of 52 is used. Thus the leading '1' position is determined and the bias value is subtracted from the value of that position (e.g., if the leading '1' position is $B_{57}$ then 52 is subtracted from 57 to result in 5 shifts to the right). the resulting values shown in column 2 of Table 1 represent the number of positions that must be shifted for the conversion.

Leading one detectors (LOD) are well known. Some LODs are commercially available, such as Texas Instrument's 4-bit or 8-bit priority encoders, e.g., TI-74LS348. LODs for detecting the position of the leading '1' in a 4-bit or 8-bit binary word typically employ 4 or 8 gate arrays, respectively. One gate array has only the first MSB as an input, the next gate array has the first 2 MSBs as inputs, the third has the first 3 MSBs as inputs, and so forth until the final gate has an input for each bit of the binary word. Leading Zero Detectors (LZD) are also well known and can be used to determine the position of the leading '1'. An 8-bit LZD circuit for implementing this logic is shown in FIG. 2. Seven AND gates are required and the AND gates must be capable of accepting up to 8 inputs. The inputs, $B_7$-$B_0$ are operated on by these seven AND gates according to the following logic equations $$G_1 = \overline{B}_7 \ \& \ \underline{B}_6$$
$$G_2 = \overline{B}_7 \ \& \ \overline{B}_6 \ \& \ B_5$$

-continued $$G_3 = \bar{B}_7 \& \bar{B}_6 \& \bar{B}_5 \& B_4$$
$$G_4 = \bar{B}_7 \& \bar{B}_6 \& \bar{B}_5 \& \bar{B}_4 \& B_3$$
$$G_5 = \bar{B}_7 \& \bar{B}_6 \& \bar{B}_5 \& \bar{B}_4 \& \bar{B}_3 \& B_2$$
$$G_6 = \bar{B}_7 \& \bar{B}_6 \& \bar{B}_5 \& \bar{B}_4 \& \bar{B}_3 \& \bar{B}_2 \& B_1$$
$$G_7 = \bar{B}_7 \& \bar{B}_6 \& \bar{B}_5 \& \bar{B}_4 \& \bar{B}_3 \& \bar{B}_2 \& \bar{B}_1 \& B_0$$

where $\bar{B}$ is the logic complement of the binary value of B, "&" is a symbol representing the AND operation and $G_1$ to $G_7$ are the outputs of the respective gates. Thus, when $G_1$ is low there is one leading zero, and the leading '1' position is $B_6$, when $G_2$ is low there are two leading zeros and the leading '1' position is $B_5$, and so forth.

The 8-bit LZD shown in FIG. 2 implements the above described logic. It is evident from this design that to increase the size of the binary input to the LZD, the AND gates must likewise be capable of accepting more inputs, i.e., a 32-bit LOD will require 31 gates where each gate accepts up to 32 inputs each. Therefore, this design is not feasible for the larger number of inputs required for many computer-related operations, e.g., locating the leading '1' in a 52-bit mantissa. However, since it is often desired to locate the leading '1' in a larger word, leading one detectors having such capability have been designed.

For example, a 32-bit LZD is described in Flynn, I. Computer Arithmetic and Logic Units, Saunders College Publishing, 1982, pages 120-125 (hereinafter "Flynn"). This LZD is shown in FIG. 3 and employs the programmable logic array (PLA) shown in FIG. 3. However, PLAs involve complicated designs and circuitry to implement the logic. Furthermore, PLAs are not easily altered to provide an output with a constant bias value, if bias value control is desired.

It is well known, that two or more such PLAs could be combined to expand the LZD of FIG. 3 to 64 or more bits. Such a combination is disclosed by Flynn and is often referred to as the carry-chain technique. For instance, Flynn describes the 64-bit LZD shown in FIG. 4 which comprises two 32-bit PLA encoders of the FIG. 3 type connected in series. The most significant 32 bits of the 64-bit input are provided to PLA 16 which determines if a leading one is present in these 32 bits. If no leading one is detected in these most significant bits, PLA 16 enables the second PLA 18 to input the remaining 32 bits and determine the position of the leading '1', if one is present. Since the detection of the leading '1' is performed on each group of bits in series, this technique introduces substantial circuit delay which increases with each PLA added to the chain. Additionally, it would not be possible to provide an output having a constant bias value using any of the known LODs in a "carry-chain" configuration.

Therefore, there is a need to provide a versatile LOD that is capable of operating on up to 64 or more bits with minimal delay, and which is simple, reliable, and easy and inexpensive to implement. The present invention achieves these goals.

SUMMARY OF THE INVENTION

According to the present invention, there is provided a circuit comprising a plurality of encoders having outputs coupled to a multiplexer tree. Each encoder accepts an input of W-bits of an n-bit binary word and detects the position of one bit of the W bits having a selected characteristic. The predetermined characteristic could include, for example, the first binary '1' detected, the first binary '0' detected, the last binary '1' detected or the last binary '0' detected. If a bit having the selected characteristic is detected among the W bits, the encoder provides an encoded output indicative of the position of that bit. The multiplexer tree comprises one or more successive levels of multiplexers. The first level has inputs coupled to the outputs of the encoders and the final level provides a single output indicative of the position of the bit having the selected characteristic among the n bits of the n-bit binary word.

In a preferred embodiment, the most significant bit of the encoded output and the outputs from each successive level of the multiplexer tree are indicative of whether a bit having the selected characteristic among respective groups of W-bits has been detected. When no bit having the selected characteristic has been detected, the circuit provides an output indicating the same.

In a further preferred embodiment, the output of the circuit is used as an indication of the number of positions that the n bits of the binary word are to be shifted for executing a computer operation such as an integer-to-floating point conversion. Additionally, the wiring connecting the inputs and outputs of the encoders and multiplexers may be altered such that the output of the circuit incorporates a bias value.

The present invention further provides a method for providing an indication of the position of a bit having a selected characteristic among n bits of an n-bit binary word. According to the method of the present invention, the n bits are grouped into groups of W bits and an encoded output indicative of the position of the bit having the selected characteristic among the W bits of each group is provided. Then a final output is provided based on the encoded outputs, indicative of the position of the bit having the selected characteristic among the n-bits of the binary word.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION

Figure 1:
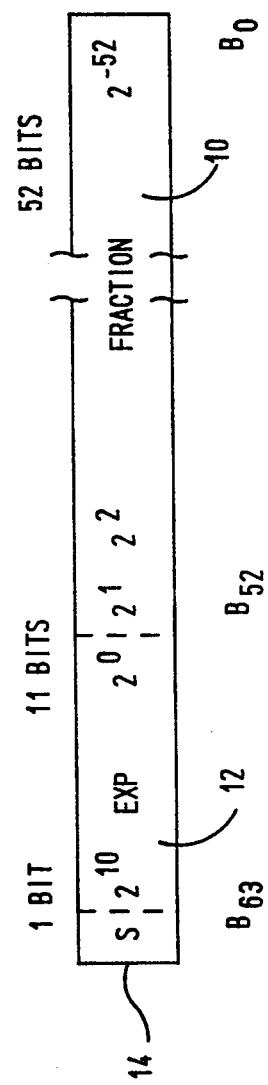
FIG. 1 shows a prior art data format of one floating point representation
Figure 2:
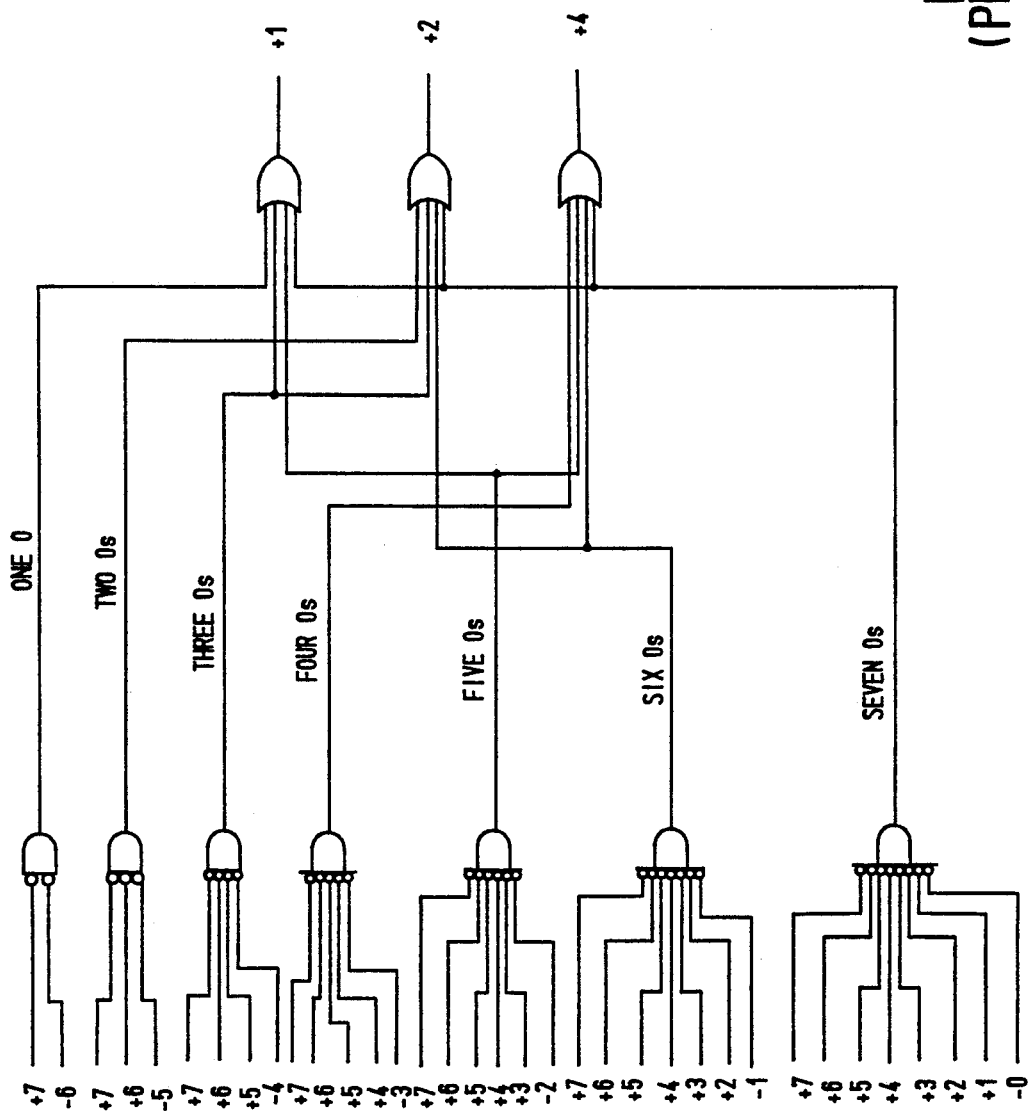
FIG. 2 depicts a prior art 8-bit LZD circuit.
Figure 3:
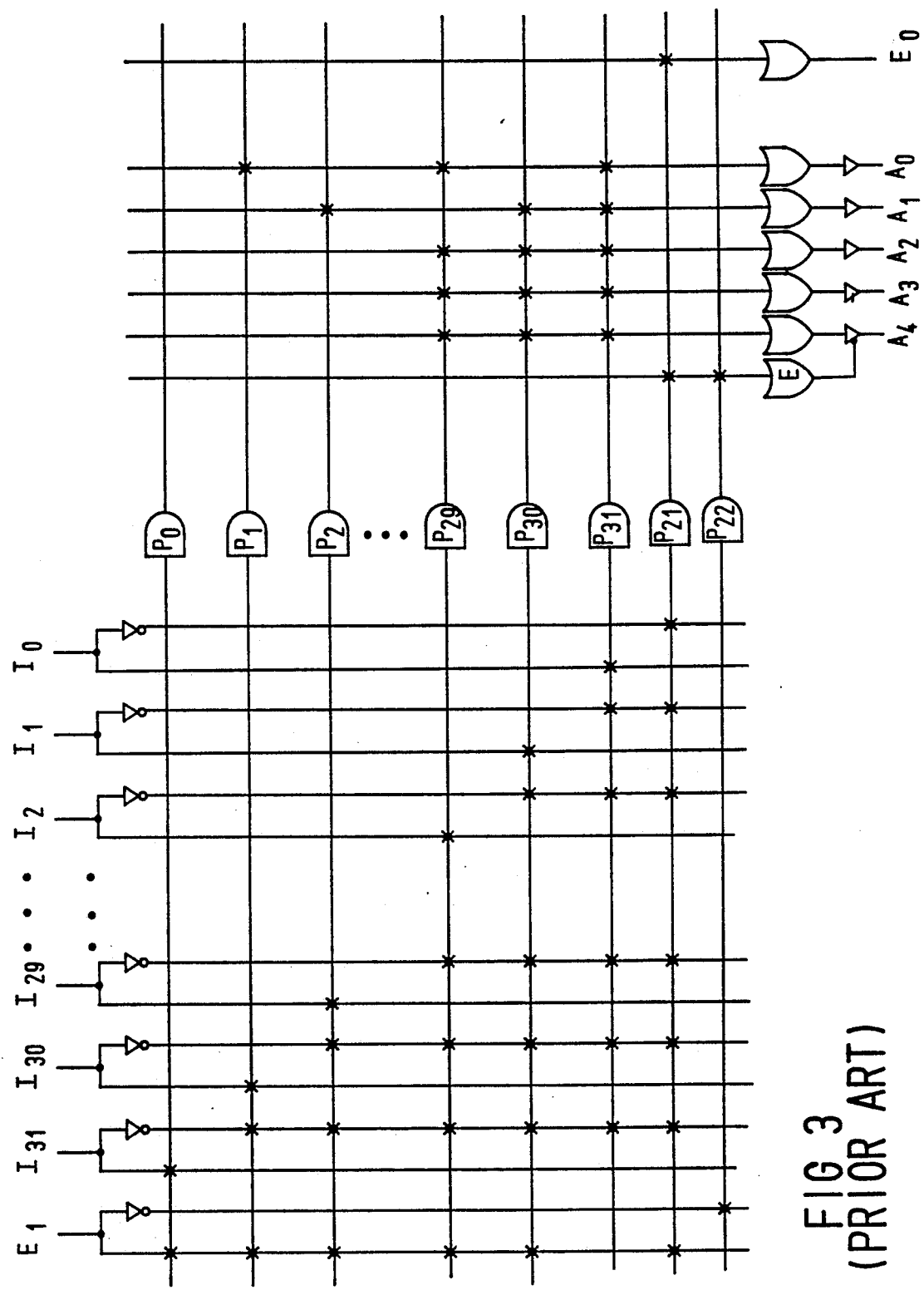
FIG. 3 depicts a prior art 32-bit LZD circuit.
Figure 4:
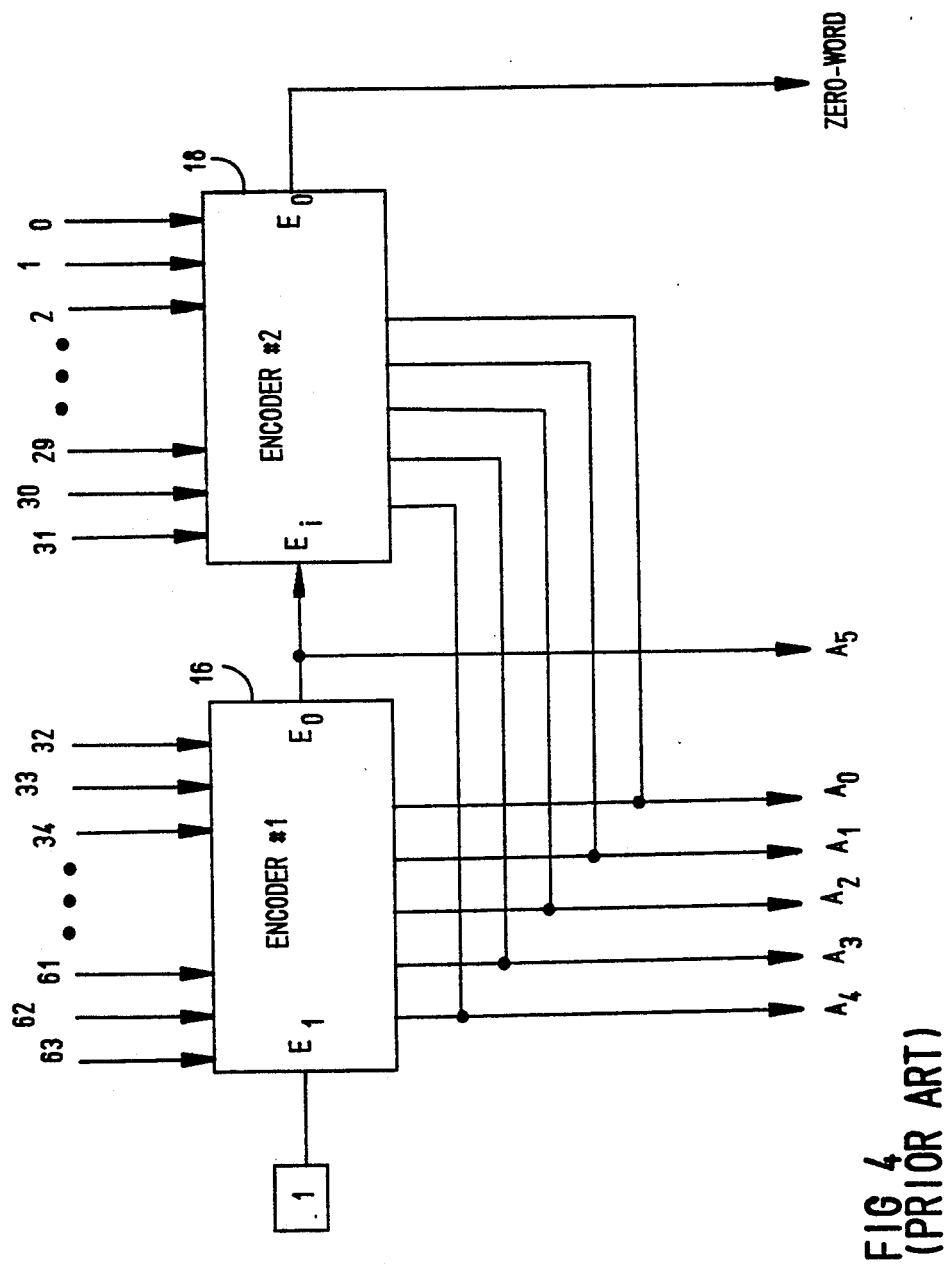
FIG. 4 depicts a prior art 64-bit LZD circuit.
Figure 5:
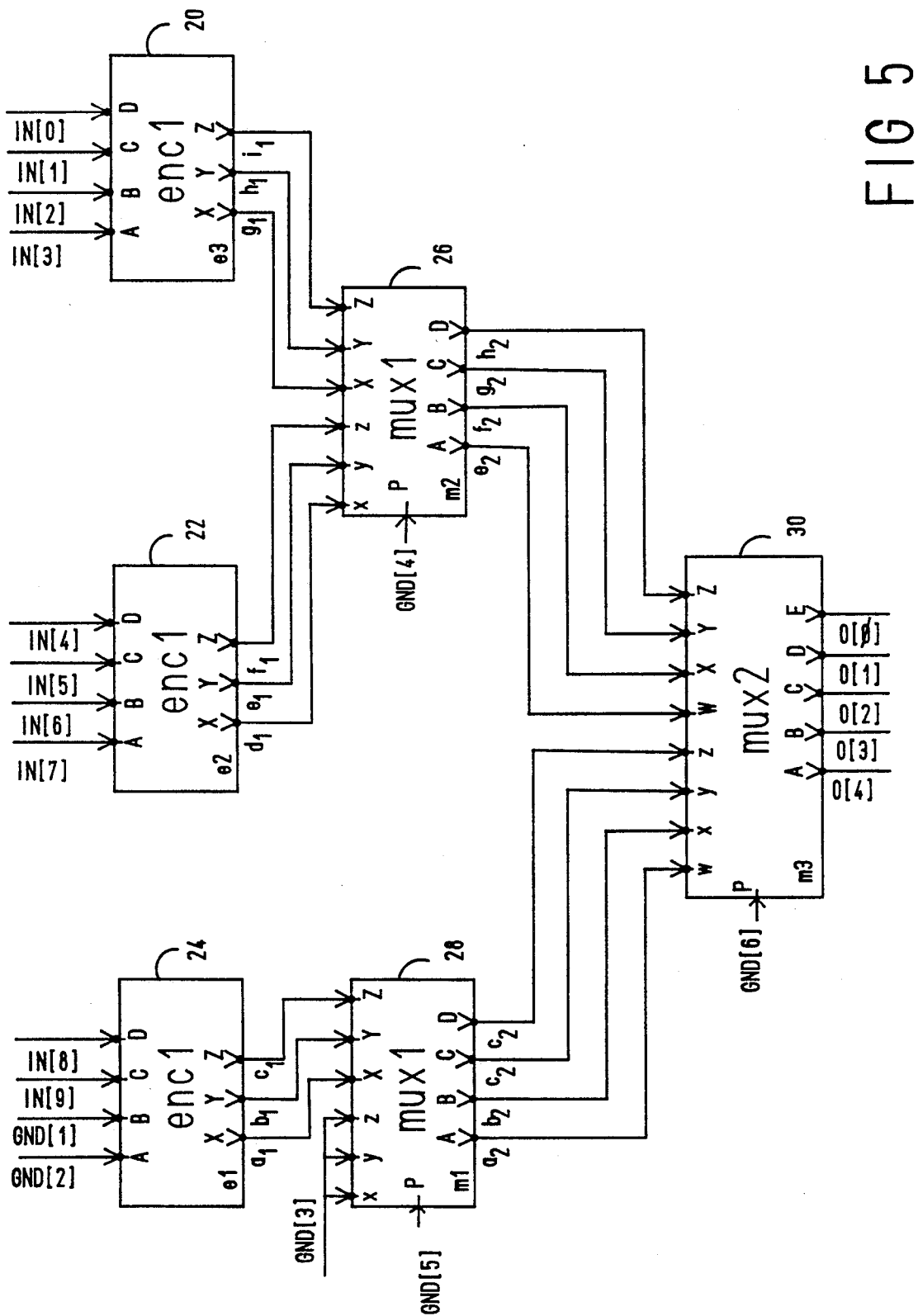
FIG. 5 depicts an exemplary 10-bit LOD circuit with no bias according to the present invention.

FIG. 5 shows a 10-bit LOD circuit according to the present invention. The circuit of FIG. 5 is shown as having a 10 bit input for exemplary purposes only, and it should be understood that the invention is in no way limited thereto. Rather, the circuit of FIG. 5 may be adapted to receive any number of binary inputs, and the invention covers all such circuits.

Encoders 20, 22, and 24 are 4 to 3 encoders in this example and collectively perform fundamental encoding of the 10 bit binary word comprising bits IN[-9]–IN[0]. The 10-bit word, IN[9] to IN[0], is divided into several groups of W bits each. In this example W is selected to be 4 bits per group, i.e., bits IN[0] to IN[3], bits numbered IN[4]–IN[7], and bits numbered IN[8] and IN[9] plus 2 inputs shown at GND[1] and GND[2] used to pad the group so that four inputs are provided to encoder 24. Each of the 4-bit groups is provided as an input to one of the encoders 20, 22, and 24. The truth table for each encoder 20, 22, and 24 (for W=4) is listed in Table 2 below.

TABLE 2

| Inputs | Outputs |
|--------|---------|
| ABCD   | XYZ     |
| 1???   | 111     |
| 01??   | 110     |
| 001?   | 101     |
| 0001   | 100     |
| 0000   | 000     |

The outputs "XYZ" are shown in FIG. 5 as $a_1$, $b_1$, and $c_1$ for encoder 24, as $d_1$, $e_1$ and $f_1$ for encoder 22 and as $g_1$, $h_1$ and $i_1$ for encoder 20.

The most significant bit (MSB) of the resulting encoded output indicates whether or not any logic '1' appears in the input. Thus, if the MSB "X" of the encoded output is a '1', a logic '1' appears somewhere in the group of W bits received at the input of the corresponding encoder. If the MSB "X" of the encoded output is a '0', there is no logic '1' in the corresponding group of W bits. The remaining bits of the encoded output, "Y" and "Z", indicate the position of the leading '1' if a leading '1' is among the W bits. For example, when the leading '1' is in the fourth position from the right (the first entry in the table) the bits "YZ" are '11' which is the binary equivalent of the decimal number 4. Likewise, when the leading '1' is in the third position from the right (the second entry in the table) the bits "YZ" are '10' which is the binary equivalent of the decimal number 3. Similarly, the bits "YZ" are '01' and '00' when the leading '1' is detected in the second position and first position, respectively (the third and fourth entries in the table).

The LOD according to the present invention also comprises a binary tree of multiplexers. The 10-bit LOD shown in FIG. 5 requires two successive levels of multiplexers. The first level comprises multiplexers 26 and 28 and the second level comprises multiplexer 30. The first level multiplexers 26 and 28 the three 3-bit encoded outputs, $a_1$ through $i_1$, into two 4-bit outputs, $a_2$ through $h_2$. The second level multiplexer 30 reduces the two 4-bit outputs, $a_2$ through $h_2$, to a single 5-bit output, O[4] through O[0]. The final output 0[5] to 0[0] indicates whether a leading '1' has been detected among the 10-bit binary word, and if so the position of that leading '1'.

At the first level of the binary tree the encoded outputs from encoders 20 and 22 ($g_1$, $h_1$ and $i_1$ and $d_1$, $e_1$, and $f_1$, respectively) are provided as inputs to multiplexer 26 and the encoded outputs from encoder 24 ($a_1$, $b_1$, and $c_1$) are provided as inputs to multiplexer 26. The second group of inputs to multiplexer 28 are grounded so that the multiplexer interprets these inputs as an encoded output indicating that all W bits were zeros.

A position bit (P) is also provided as an input to each multiplexer. In this example, the position bit P is a binary "0". One way to achieve a binary value of "0" is to ground the input corresponding to the position bit P (hereinafter all references to "grounded" inputs will be presumed to provide a binary value of "0"). For instance, position bit P is grounded as shown in FIG. 5 at GND[4] of multiplexer 26, at GND[5] of multiplexer 28 and at GND[6] of multiplexer 30. Thus, the binary value of the position bit P is "0" for each of these multiplexers. The purpose of the position bit will be described below. The truth table for each of the first level multiplexer is listed in Table 3 below.

TABLE 3

| Inputs |     | Outputs |   |   |   |
|--------|-----|---------|---|---|---|
| xyz    | XYZ | A       | B | C | D |
| 1ij    | ??? | 1       | P | i | j |
| 0??    | 1IJ | 1       | P | I | J |
| 0??    | 0?? | 0       | 0 | 0 | 0 |

The MSB of the resulting output from a first level multiplexer indicates whether or not a leading '1' was detected in either of the 4-bit inputs to the fundamental encoders providing the encoded outputs to the multiplexer. For example, if the input 'xyz' to multiplexer 26 is the encoded output $d_1$, $e_1$ and $f_1$ of encoder 22 and the input 'XYZ' is the encoded output $g_1$, $h_1$ and $i_1$ of encoder 20, then multiplexer 26 will provide an output with a MSB "A" of '1' if either "x" or "X" is a '1'. In other words, if the input to encoder 22, bits IN[7] to IN[4], was '0000', respectively, the output of encoder 22 from Table 2 would be '000'. If the input to encoder 20, bits IN[3] to IN[0], was '1001' respectively, the output of encoder 22 from Table 2 would be '111'. Thus, the input "xyz" to multiplexer 26 would be '000' from encoder 22 and the input "XYZ" to multiplexer 26 would be '111' from encoder 20. According to Table 3, the MSB of the output from multiplexer 26 "A" would, therefore, be a binary '1', since a '1' was present among the group of bits IN[3]–IN[0].

The next MSB of the output provided by multiplexer 26, "B", is an indication of which of its encoded outputs identify the position of the leading '1'. Since the W bits input to encoder 22, IN[7]–IN[4], lead the W bits input to encoder 20, IN[3] to IN[0], if the encoded output from encoder 22 indicates that a leading '1' was detected, multiplexer 26 does not have to consider whether a leading '1' was detected by encoder 20 because any '1' detected by encoder 20 would necessarily follow the leading '1' detected by encoder 22 and would not be a leading '1'. This result can be best described by returning to the example set forth above. Since none of the input bits, IN[7] to IN[4], was identified as a '1' as indicated by the output '000' of encoder 22, the leading '1' if any, must be found from the bits IN[3] to IN[0] among the input bits, IN[7] to IN[0].

If a leading '1' is present, a position bit P appears in the output of the multiplexers 26 and 28. The value of the position bit P indicates where the leading '1' is located, i.e., in the leading W bits IN[7]–IN[4] or the following W bits IN[3] to IN[0] of the respective encoders. Thus when a leading '1' is detected in the leading group of W bits, the next MSB "B" output from the multiplexer has a value of $\overline{P}$ (since P is grounded in FIG. 5, its complement is a binary '1') and the remaining bits indicate the position of the leading '1' within the group according to the respective encoded outputs. When a leading '1' is not detected in the leading group, but rather in the following group, the next MSB "B" has the value of P and the remaining bits "CD" indicate its position within that group. Again, returning to the same example, since the leading '1' is located in the second group of W-bits, IN[3]-IN[0], the output bit "B" of multiplexer 26 according to Table 3 is a binary '0'. The remaining bits "CD" of the output from multiplexer 26 would be '11' according to Table 3.

The second level of the multiplexer tree, which in this example comprises multiplexer 30, preferably accepts an output from two multiplexers in the first level. For instance in FIG. 5, multiplexer 30 has inputs coupled to the outputs of multiplexer 26 ($e_2$, $f_2$, $g_2$ and $h_2$) and an input coupled to the outputs of multiplexer 28 ($a_2$, $b_2$, $c_2$ and $d_2$). Additionally, multiplexer 30 has an input for accepting the position bit P which is grounded in FIG. 5 at GND[6]. Multiplexer 30 operates substantially in the same manner as multiplexers 26 and 28 of the previous level. Accordingly, multiplexer 30 implements the truth table listed in Table 4, below.

TABLE 4

| Inputs | | Outputs | | | | |
|---|---|---|---|---|---|---|
| wxyz | WXYZ | A | B | C | D | E |
| 1ijk | ???? | 1 | P | i | j | k |
| 0??? | ?IJK | 1 | P | I | J | K |
| 0??? | 0??? | 0 | 0 | 0 | 0 | 0 |

It should be understood that a LOD circuit according to the present invention is quite versatile in that the binary word input to the LOD is not limited by the number of bits it contains and the gate delays can be minimized by selecting an appropriate balance between the size of the encoders and multiplexers used, with the number of levels comprising the multiplexer tree. For instance, the number of bits input to each fundamental encoders, W, must be an integer power of 2 greater than zero, i.e., 2, 4, 8, etc. The number of encoders N required, given the number of bits n of the binary word input to the LOD is:

$$N = Int [n/W] + 1$$

The number of multiplexers required to implement the multiplexer tree will correspondingly be approximately N (in some cases it may be less). However, N/2 multiplexers will be required for the first level. The number of levels L required is:

$$L = Log_2 (X)$$

where X is the power of 2 that is equal to, or closest to N, but is not less than N. For example, if N = 5, 6, or 7 then X = 8. Similarly, if N = 8, then X = 8. Therefore, the number of levels L required is dependent upon the number of input bits n and the number of bits W input to each encoder.

It will be understood that the more levels used to implement the multiplexer tree the greater the propagation delay, and hence the slower the circuit. However, since the complexity and cost of each encoder and multiplexer increases with its size, i.e., as W increases, it is not always desirable to have the fewest number of levels L. Therefore, the selection of n and W can be balanced with the number of levels L to maximize the LOD circuit's performance in terms of time delay, cost, and complexity.

As explained below, the wiring of the disclosed LOD circuit can be easily altered so that the output provided by the multiplexer tree incorporates a bias value. As previously described, the output of an LOD is typically used to shift the binary input a number of positions based on the position of the leading '1'. Furthermore, depending on the purpose of the shifting, e.g., integer-to-floating point conversion, the bias value may vary.

Figure 6:
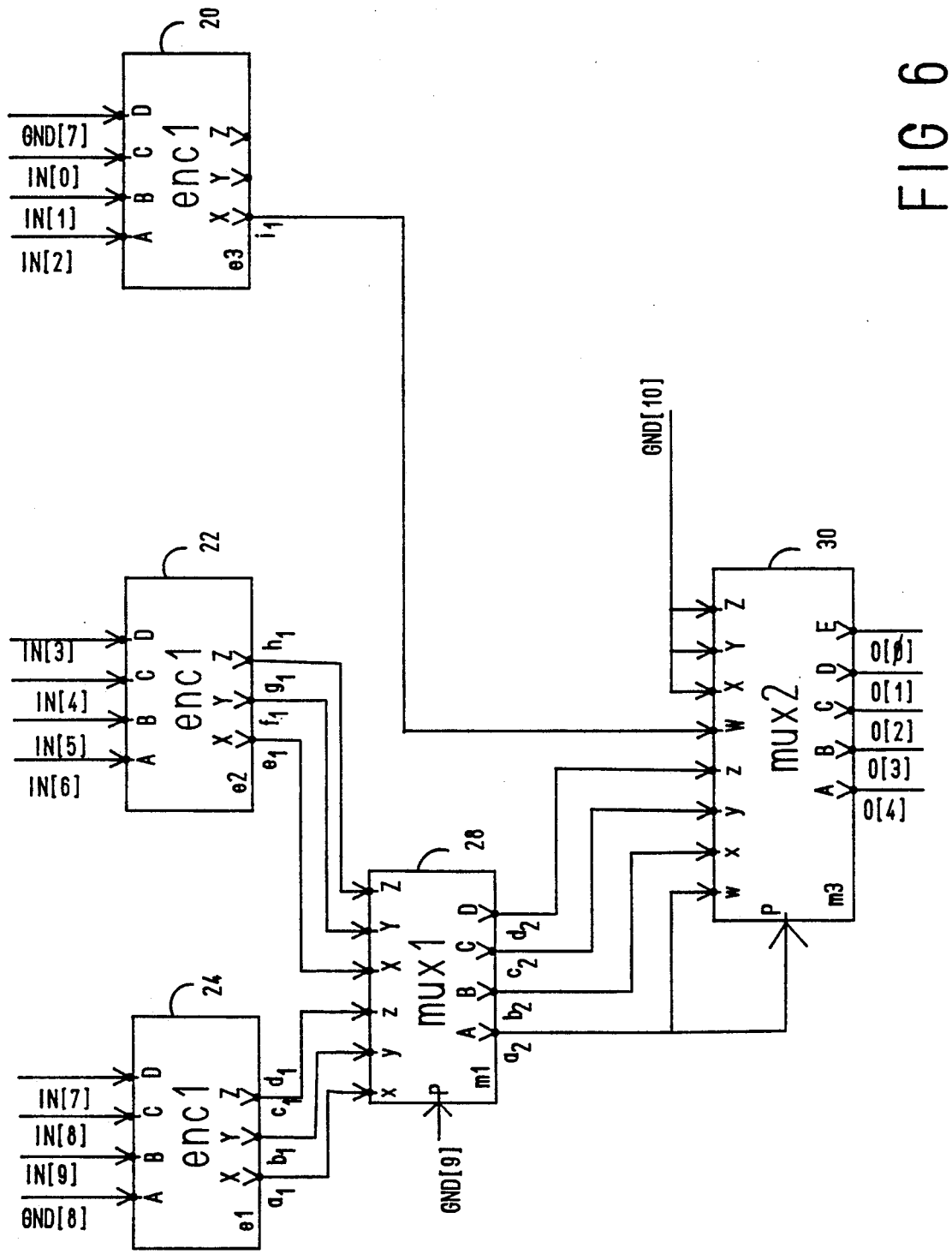
FIG. 6 depicts an exemplary 10-bit LOD circuit with an exemplary bias value of $-3$ according to the present invention.
Figure 7:
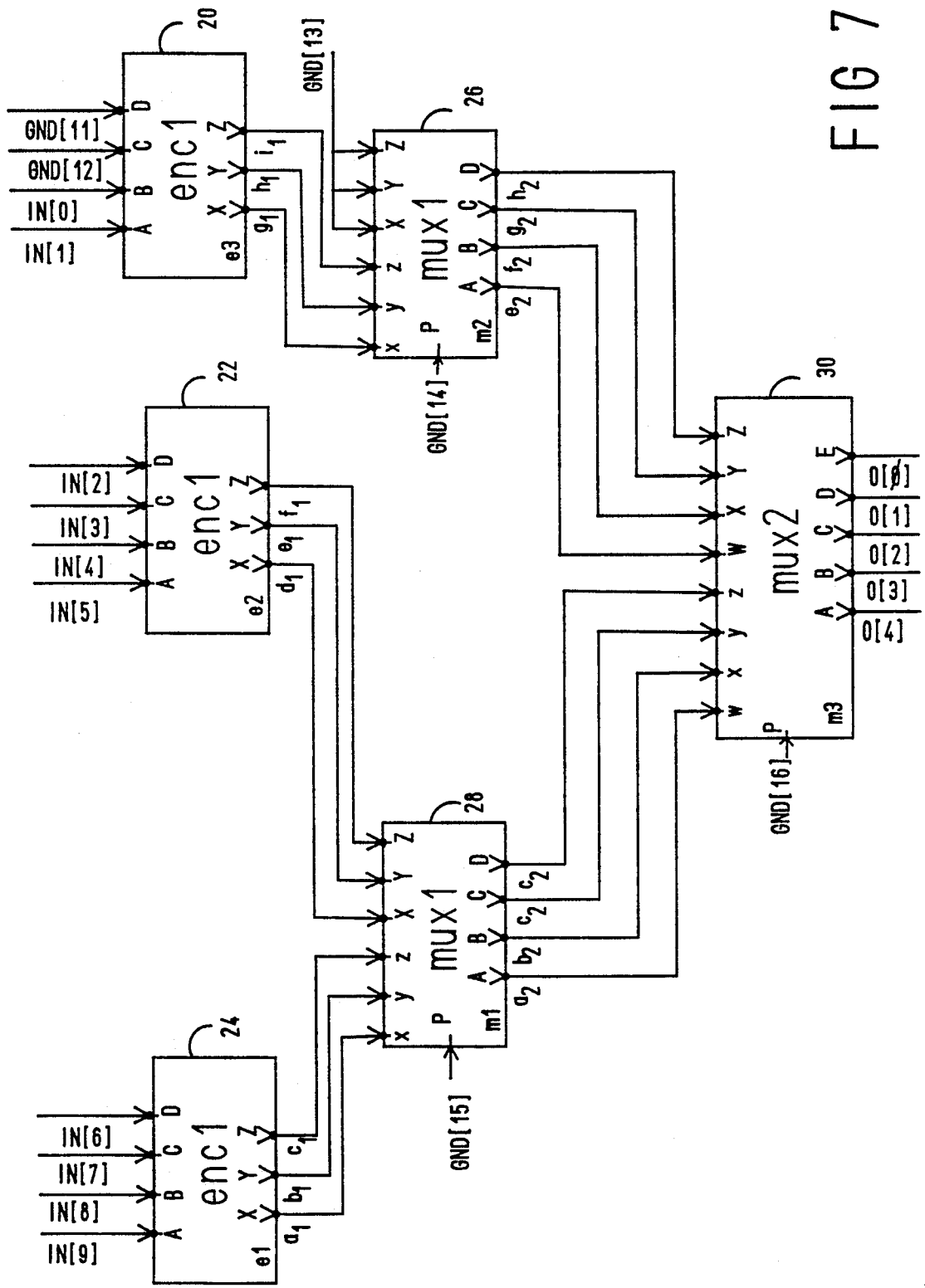
FIG. 7 depicts an exemplary 10-bit LOD circuit with an exemplary bias value of $+6$ according to the present invention.

FIG. 6 illustrates an exemplary 10-bit LOD circuit providing a bias value of −3 and FIG. 7 illustrates an exemplary 10-bit LOD circuit providing a bias of +6. It is readily apparent that only the wiring connecting the inputs and outputs is altered. For instance, the 10 bit binary word, IN[9]-IN[0], is arranged into different groups of 4-bits in each of FIGS. 5, 6 and 7. Similarly, the outputs of the encoders 20, 22, and 24, $a_1$ through $i_1$, are provided to the first level of multiplexers in each of the Figures. First level multiplexer 26 can be eliminated in the LOD circuit shown in FIG. 6 for providing a bias value of −3 and therefore the inputs to multiplexer 30 "WXYZ" are provided by the output $i_1$ of encoder 20 and 3 grounded bits at GND[10]. Also note that the position bit P input to multiplexer 30 shown in FIG. 6 is not grounded, i.e., its value is not a binary '0' in all cases, but is the output $a_2$ from multiplexer 28 such that its value varies depending upon the input bits IN[9] through IN[3].

The effect of providing a bias can be seen from Table 5 below. For each 10-bit binary word an input to the LOD circuits of FIGS. 5, 6 and 7 respectively, the corresponding output is listed with its decimal equivalent of the number of positions the binary word would be shifted.

TABLE 5

| Leading '1' Position | Binary Word | (LOD+0) | | (LOD−3) | | (LOD+6) | |
|---|---|---|---|---|---|---|---|
| | | SHIFT | OUTPUT ABCDE | SHIFT | OUTPUT ABCDE | SHIFT | OUTPUT ABCDE |
| 10 | 1???????? | 9 | 11001 | 6 | 10110 | 15 | 11111 |
| 9 | 01??????? | 8 | 11000 | 5 | 001?14 | 11110 | |
| 8 | 011?????? | 7 | 10111 | 4 | 10100 | 13 | 11101 |
| 7 | 0001????? | 6 | 10110 | 3 | 10011 | 12 | 11100 |
| 6 | 00001???? | 5 | 10101 | 2 | 10010 | 11 | 11011 |
| 5 | 000001??? | 4 | 10100 | 1 | 10001 | 10 | 11010 |
| 4 | 0000001?? | 3 | 10011 | 0 | 10000 | 9 | 11001 |
| 3 | 00000001? | 2 | 10010 | 0 | 10000 | 8 | 11000 |
| 2 | 000000001? | 1 | 10001 | 0 | 10000 | 7 | 11111 |
| 1 | 0000000001 | 0 | 10000 | 0 | 10000 | 6 | 10110 |
| 0 | SHIFT | 00000 | NO | 00000 | NO | 00000 | |
| | | | SHIFT | | SHIFT | | SHIFT |

Since the encoders and multiplexers perform according to the truth tables listed in Tables 2 through 4, regardless of the bias value selected, the present invention is preferably designed using a hardware description language which aids in determining the appropriate wiring for implementing an LOD with a desired bias value.

For example, the code listed below could be used to design any of the LODs shown in FIGS. 5, 6 or 7. It is written using "VERILOG", a hardware design language by cadence Design Systems, Inc. "VERILOG" and other hardware design languages are well known.

```
module enc1 (A, B, C, D, X, Y, Z);
    input A,B,C,D;
    output X,Y,Z;
    reg X,Y,Z;
    always @ (A or B or C or D) begin
        X=A|B|C|D;
        Y=A|B;
        Z=A|~B&C;
    end
endmodule
module MUX1 (A, B, C, D, F, X, Y, Z, x, y, z);
    output A,B,C,D;
    input P,X,Y,Z,x,y,z;
    reg A,B,C,D;
    always @ (P or x or y or z or X or Y or Z) begin
        A = X | x;
        B = x ^ P;
        C = x&y | ~x&Y;
        D = x&z | ~x&Z;
    end
endmodule
module MUX2 (A, B, C, D, E, P, W, X, Y, Z, w, x, y, z);
    output A,B,C,D,E;
    input P,W,X,Y,Z,w,x,y,z;
    reg A,B,C,D,E;
    always @ (P or w or x or y or z or W or X or Y or
    Z) begin
        A = W | w;
        B = w ^ P;
        C = w&x | ~w&X;
        D = w&y | ~x&Y;
        E = w&z | ~w&Z;
    end
endmodule
```

The symbol "|" in the above code represents a logic OR operation, the "&" represents a logic AND operation, the symbol "~" represents a compliment of the binary value following the "~", and the " ^ " indicates an XOR operation.

The encoder module (enc1), first multiplexer level module (mux1), and the second multiplexer level module (mux2) are valid for any n=10 bit binary word and W=4 bit groupings. Therefore, the truth tables and code remain the same no matter what bias value is selected. The wiring is altered until the output of the multiplexer tree "ABCDE" provides the desired outputs for a selected bias value. For instance the desired outputs for a bias of 0, −3 and +6 are shown in Table 5.

A method according to the present invention could be implemented by other circuits or even carried out in software. The n bits of an n-bit binary word would be arranged in groups of W bits. Using the 10-bit binary word and W=4 example, each group of W-bits would be encoded according to the truth table set forth in Table 2. Software to perform such encoding would resemble the encoder module (e nc 1) written in VERILOG and set forth above. Similarly, the method of the present invention does not require an encoder to perform this encoding step but rather any circuit which will operate according to the truth table.

Then according to the method of the present invention, the encoded outputs are arranged in groups having two different encoded outputs. When there is not an even number of encoded outputs, i.e., N is odd, additional bits are provided to form the group, e.g. grounded bits are provided as a second encoded output of the group. The bits of each group are then operated on according to the truth table set forth in Table 3 or implemented using code similar to the VERILOG module MUX1 listed above to provide first level outputs. The first level outputs are then arranged in groups having two different first level outputs. Again, it should be understood that an additional output of grounded bits may be used to form one of these groups. In this example, there is only 1 group corresponding to the inputs of multiplexer 30. This group is then in turn operated upon to provide an output according to the truth table set forth in Table 4 (or by using similar code to the VERILOG module MUX2 code provided above).

It should also be understood that the present invention could easily be modified for detecting a leading '0' or for detecting a trailing '1' or trailing '0'. While the invention has been described and illustrated with reference to specific embodiments, those skilled in the art will recognize that modification and variations may be made without departing from the principles of the invention as described hereinabove and set forth in the following claims.

I claim:

1. A circuit comprising:
   a) encoder means having inputs for receiving an n-bit binary word and for simultaneously operating upon all bits of the n-bit binary word in groups of W-bits, where W is less than n, the encoder means being operative to provide at outputs thereof indications of whether any one of the bits in each group of W-bits has a selected characteristic, and if so, for providing an indication of the position of the bit having the selected characteristic within its corresponding group of W-bits; and
   b) multiplexer means having inputs receiving the outputs from the encoder means and simultaneously operating thereupon to provide an output indicative of the position of a first occurrence of the bit having the selected characteristic in the n-bit binary word.

2. Circuit according to claim 1 wherein the encoder means comprises a plurality of encoders, each encoder receiving the bits from a different one of the groups of W-bits, and the multiplexer means comprises a plurality of multiplexers arranged to define a tree having a plurality of levels, the first level of the tree receiving the outputs from the encoder means, each successive level receiving outputs from a preceding level of the tree.

3. Circuit according to claim 1, wherein the selected characteristic comprises one of:
   a) a leading "1" in each group of W-bits;
   b) a leading "0" in each group of W-bits;
   c) a trailing "1" in each group of W-bits; and
   d) a trailing "0" in each group of W-bits.

4. Circuit according to claim 1, wherein the outputs from the encoder means comprise groups of b-bits each corresponding to one of the groups of W-bits, a most significant bit of each group of b-bits indicating whether any one of the bits in the corresponding group of W-bits has the selected characteristic, and remaining ones of the b-bits indicating the position of the bit having the selected characteristic.

5. Circuit according to claim 2, wherein there are N encoders and no more than N multiplexers, a final level of the tree having only a single multiplexer.

6. Circuit according to claim 5, wherein the number N of encoders is determined according to the following relationship:

Int [n/W]+1;

where "Int" designates an integer portion of the relationship;
"n" is the number of bits in the n-bit binary word; and
"W" is the number of bits in each group of W-bits.

7. Circuit according to claim 5, wherein the number of levels of multiplexers in the tree is:

$Log_2 (X)$ where X is a power of two that is closest to, but is not less than, the value of N.

8. Circuit according to claim 1, wherein the output of the multiplexer means is indicative of a number of times that the n-bit binary word should be shifted to convert the n-bit binary word from a first form to a second form.

9. Circuit according to claim 8 wherein the first form is an integer form and the second form is a floating point form.

10. Circuit according to claim 8, wherein the output of the multiplexer means incorporates a bias value.

11. A circuit comprising:
a) a plurality of encoders, each encoder having inputs for receiving groups of W-bits of an n-bit binary word, where W is less than n, each encoder receiving the bits from a different one of the groups of W-bits and simultaneously operating upon the W-bits so received to provide an output of b-bits having a most significant bit indicative of whether any one of the bits in the group of W-bits has a selected characteristic, and if so, the remaining ones of the b-bits indicating the position of the bit having the selected characteristic within its corresponding group of W-bits; and
b) a plurality of multiplexers arranged to define a tree having a plurality of levels, each multiplexer having inputs and outputs, the inputs of the multiplexers in a first level receiving the outputs from the plurality of encoders, the inputs of the multiplexers of each successive level receiving outputs from multiplexers of a preceding level, the plurality of multiplexers simultaneously operating upon the inputs thereto to provide a final output indicative of the position of a first occurrence of the bit having the selected characteristic in the n-bit binary word.

12. Circuit according to claim 11, wherein the selected characteristic comprises one of:
a) a leading "1" in each group of W-bits;
b) a leading "0" in each group of W-bits;
c) a trailing "1" in each group of W-bits; and
d) a trailing "0" in each group of W-bits.

13. Circuit according to claim 11, wherein there are N encoders and no more than N multiplexers, where N is an integer greater than zero, the number N being determined according to the following relationship:

Int [n/W]+1;

where "Int" designates integer portion of the relationship;
"n" is the number of bits in the n-bit binary word; and
"W" is the number of bits in each group of W-bits; and
the number of levels of multiplexers in the tree is:

$Log_2 (X)$ where X is a power of two that is closest to, but is not less than, the value of N.

14. A circuit comprising:
a) a plurality N of encoders, each encoder having inputs for receiving groups of W bits of an n-bit binary word, where W is less than n, the number N of encoders is determined according to the following relationship:

Int [n/W]+1;

where "Int" designates an integer portion of the relationship;
"n" is the number of bits in the n-bit binary word: and,
"W" is the number of bits in each group of W-bits, each of the N encoders receiving the bits from a different one of the groups of W-bits and simultaneously operating upon the W-bits so received to provide N outputs thereof, each output being indicative of whether any one of the bits in the group of W-bits has a selected characteristic, and if so, for providing an indication of the position of the bit having the selected characteristic within its corresponding group of W-bits;
b) a plurality of multiplexers arranged to define a tree having L successive levels, the number of successive levels L in the tree is:

$Log_2 (X)$ where "X" is a power of two that is closest to, but is not less than the value of N, each of the multiplexers having inputs and outputs, the inputs of the multiplexers in a first level of the tree receiving the outputs from the N encoders, the inputs of the multiplexers of each successive level receiving outputs from multiplexers of a preceding level, the plurality of multiplexers simultaneously operating upon the inputs thereto to provide a final output indicative of the position of a first occurrence of the bit having the selected characteristic in the n-bit binary word; and
the selected characteristic being one of:
i) a leading "1" in each group of W-bits;
ii) a leading "0" in each group of W-bits;
iii) a trailing "1" in each group of W-bits; and
iv) a trailing "0" in each group of W-bits.

15. Circuit according to claim 14, wherein the output from each of the N encoders comprises b-bits collectively forming N groups of b-bits each group corresponding to one group of W-bits, a most significant bit of each group of b-bits indicating whether any one of the bits in the corresponding group of W-bits has the selected characteristic, and if so, the remaining ones of the b-bits indicating the position of the bit having the selected characteristic.

16. A method of providing an indication of a position of a bit having a selected characteristic among n bits of an n-bit binary word comprising the steps of:
loading, in an encoding means having inputs and outputs, the n-bit binary word, the n bits being arranged in groups of W-bits at inputs of the encoding means, where n is greater than W;

providing for each group of W bits at the output of the encoding means, an encoded output indicative of whether any one of the W bits of the corresponding group of W-bits has the selected characteristic, and if so, further providing at the output of the encoding means, an indication of the position of the bit having the selected characteristic within its corresponding group of W bits; and providing based upon each of the encoded outputs, a final output indicative of the position of a first occurrence of the bit having the selected characteristic in the n-bit binary word.

17. The method of claim 16, wherein the selected characteristic comprises at least one of:
  a) the first binary '1' of the group of W bits,
  b) the first binary '0' of the group of W bits,
  c) the last binary '1' of the group of W bits, and
  d) the last binary '0' of the group of W bits.

18. The method of claim 16, wherein each encoded output comprises b-bits corresponding to one of the groups of W-bits, a most significant bit of the b-bits indicating whether any one of the bits in the corresponding group of W-bits has the selected characteristic, and if so, the remaining ones of the b-bits indicating the position of the bit having the selected characteristic.

19. The method of claim 16, further comprising the step of:
  shifting the n-bit binary word by one position a number of times based on the position of the first occurrence of the bit having the selected characteristic.

20. The method of claim 16, wherein the final output is capable of incorporating a bias value therein, the method further comprising the step of:
  controlling an amount of the bias value so that the position of the first occurrence of the bit having the selected charateristic is offset by the amount of the bias value.

* * * * *